(12) United States Patent
Kawawa et al.

(10) Patent No.: US 7,722,841 B2
(45) Date of Patent: May 25, 2010

(54) POLYMERIC CHELANT AND COAGULANT TO TREAT METAL-CONTAINING WASTEWATER

(75) Inventors: Baraka Kawawa, Bensalem, PA (US); Stephen R. Vasconcellos, Doylestown, PA (US); William Sean Carey, Wallingford, PA (US); Nicholas R. Blandford, Willow Grove, PA (US)

(73) Assignee: General Electric Company, Schenectady, NY (US)

( * ) Notice: Subject to any disclaimer, the term of this patent is extended or adjusted under 35 U.S.C. 154(b) by 612 days.

(21) Appl. No.: 11/380,090

(22) Filed: Apr. 25, 2006

(65) Prior Publication Data

US 2007/0248512 A1    Oct. 25, 2007

(51) Int. Cl.
     *C01G 3/00*      (2006.01)
     *C08G 75/14*      (2006.01)
     *C08H 5/02*      (2006.01)

(52) U.S. Cl. .......... 423/42; 423/21.1; 423/23; 423/24; 423/155; 423/158; 210/638; 210/723; 210/725; 210/728; 252/175; 252/181; 252/394; 527/390; 527/400

(58) Field of Classification Search ............ 423/3, 423/23, 24, 21.1, 155, 158, 42; 210/725, 210/638, 723, 728; 252/181, 175, 394; 527/390, 527/400; *C08G 75/14*; *C08H 5/02*
See application file for complete search history.

(56) References Cited

U.S. PATENT DOCUMENTS

| | | |
|---|---|---|
| 3,947,354 A | 3/1976 | Swanson et al. |
| 4,558,080 A | 12/1985 | Quamme et al. |
| 4,624,790 A * | 11/1986 | Kamperman ............... 210/665 |
| 4,734,216 A | 3/1988 | Kelley et al. |
| 4,741,831 A | 5/1988 | Ginstead |
| 4,781,839 A | 11/1988 | Kelley et al. |
| 5,594,096 A | 1/1997 | Carey et al. |
| 5,871,648 A | 2/1999 | Allen et al. |
| 5,891,956 A | 4/1999 | Smith et al. |
| 5,916,991 A | 6/1999 | Chen et al. |
| 5,965,027 A | 10/1999 | Allen et al. |
| 6,217,778 B1 * | 4/2001 | Shing ............... 210/708 |
| 6,258,277 B1 | 7/2001 | Salmen et al. |
| 6,258,279 B1 * | 7/2001 | Shah ............... 210/734 |
| 6,312,601 B1 | 11/2001 | Allen et al. |
| 6,315,906 B1 | 11/2001 | Sassaman et al. |
| 6,398,964 B1 * | 6/2002 | Brady et al. ............... 210/638 |
| 6,428,705 B1 | 8/2002 | Allen et al. |
| 6,818,129 B2 | 11/2004 | Kemp et al. |
| 2002/0003112 A1 | 1/2002 | Golden |
| 2007/0029260 A1 | 2/2007 | Wismer et al. |

FOREIGN PATENT DOCUMENTS

| | | | |
|---|---|---|---|
| JP | 11033560 | * | 9/1999 |
| SU | 1782941 A1 | | 12/1992 |
| WO | WO 96/38493 | | 12/1996 |
| WO | WO 2004/074183 A2 | | 9/2004 |

OTHER PUBLICATIONS

W.G. Mitchell & M.M Jones, "Poly(Ethyleneiminoacetic acid)," J. Inorg. Nucl. Chem., vol. 40, pp. 199-201, Pergamon Press, 1978.
D.T. Russouw et al., "The Kinetics of Condensation of Phenolic Polyflavonoid Tannins with Aldehydes," J. Poly . Sci.: Poly. Chem. Ed., vol. 18, pp. 3323-3343, Wiley & Sons, Inc., 1980.
Int'l Search Report, PCT/US2007/066041, filed Sep. 17, 2007.

* cited by examiner

*Primary Examiner*—Melvin C Mayes
*Assistant Examiner*—Jun Li
(74) *Attorney, Agent, or Firm*—Duane Morris LLP

(57) ABSTRACT

The present invention is directed to the use of a combination of a polymeric chelant and coagulant to treat metal containing wastewater. More particularly, the invention is directed at removing copper from CMP wastewater. The composition includes a combination of (a) a polymeric chelant derived from a polyamine selected from the group consisting of diethylenetriamine (DETA), triethylenetetraamine (TETA), tetraethylenepentaamine (TEPA), poly[vinylamine], and branched or linear poly[ethylenimine] (PEI); and (b) a water soluble or dispersible copolymer of a tannin and a cationic monomer selected from the group consisting of methyl chloride or dimethyl sulfate quaternary salt of dimethyl aminoethyl acrylate, diethylaminoethyl acrylate, dimethylaminoethyl methacrylate, diethylaminoethyl methacrylate, dimethylaminopropyl methacrylamide, dimethylaminopropyl acrylamide, and diallyl dimethyl ammonium chloride.

14 Claims, No Drawings

POLYMERIC CHELANT AND COAGULANT TO TREAT METAL-CONTAINING WASTEWATER

FIELD OF THE INVENTION

The present invention relates to the use of a water-soluble polymeric chelant, in combination with a water-soluble coagulant to precipitate contaminants from aqueous solutions and/or dispersions.

BACKGROUND OF THE INVENTION

Despite minor setbacks in use of copper integrated circuits, the semiconductor industry, together with associated research institutions, are progressively solving current problems and are adopting copper as a next generation semiconductor material. With this trend as a driving force, there is a need to develop advanced solutions to address current and future health, economic, and environmental issues that are associated with copper and other metal-bearing waste.

In the semiconductor manufacturing industry, treatment of wastewater containing heavy metal ions and abrasive solids to meet discharge levels (as mandated by EPA and local authorities) has been continuously challenging, sometimes unreliable and often expensive. This is mainly due to time wasted and operating costs associated with the chemical conditioning of wastewater during processing, such as use of mineral acids for wastewater pH adjustment and use of expensive polishing agents. Other costs arise from membrane treatment to reduce fouling, metals recovery from ion exchange and general costs resulting from high capital equipment maintenance, such as filter bed replacement.

In attempts to solve economic and environmental problems associated with treating chemical mechanical planarization (CMP) wastewater, several methods and chemical compositions for removing metals ions from waste streams are currently in use.

For instance, Grinstead, in U.S. Pat. No. 4,741,831 teaches a cyclic process for treating an aqueous metal-bearing waste stream which comprises: 1) contacting the aqueous waste stream with a polymeric chelant to form a soluble metal complex, 2) using membrane separation to remove the aqueous portion, 3) contacting the concentrate with a mineral acid to release the metal, 4) using a second membrane filtration to separate the metal filtrate from the regenerated polymeric chelant, and 5) recycling the aqueous polymeric chelant concentrate to the contact zone of the first step.

Allen et al. in U.S. Pat. Nos. 5,871,648; 5,965,027; 6,312,601 and 6,428,705 teach processes for removing metal and non-metal contaminants from wastewater comprising: 1) adjusting pH of the wastewater stream and treating it with an organic or inorganic coagulant to form a particulate (or agglomerate) in excess of 5 microns in size, 2) passing the treated wastewater through a microfiltration membrane to remove the contaminants, and 3) periodically back-flushing the microfiltration membrane to remove the solid contaminants from the membrane surface. This technology operates in a single pass, with no reconcentration mode. The preferred organic polymeric coagulants, by way of example, are poly[epichlorohyrin-co-dimethylamine] (pEPI/DMA) and poly[diallyldimethylamonium chloride] (pDADMAC) polymers. It is further taught that, for metal containing waste, it may be desirable to add a metal removal agent to yield an insoluble metal precipitate that is absorbed by the coagulant. In the examples with CMP slurries, the chemical treatments are added directly to the slurry and then processed directly via microfiltration.

Salmen et al., in U.S. Pat. No 6,258,277 teach a process for removing heavy metals from a semiconductor wastewater containing abrasive solids comprising: 1) adding an effective amount of a water-soluble polymer containing dithiocarbamate functionality (DTC-polymer), 2) precipitating heavy metal ions, and 3) passing wastewater through a microfilter to remove the abrasive solids and precipitated heavy metal ions. It is further taught that the use of a coagulant in conjunction a DTC-polymer will adversely affect permeate flux and quality.

Carey et al., in U.S. Pat. No. 5,594,096 teaches a composition effective for removing metals from wastewater comprising the dithiocarbamate analogs of poly[ethylenimine]. It is further noted in the teachings that filtering the treated wastewater can enhance the efficiency of the metals removal.

Smith et al., in PCT WO 96/38493 discloses a number of water-soluble polymers, including poly[ethylenimine] derivatized with chelating functionality for use in separating metals from aqueous streams. It is further disclosed that the permeate flux of a treated waste stream through an ultrafiltration membrane can be enhanced by "prepurifying" the polymer before derivatization to remove low molecular weight species. Example 2 (polymer B) of WO '493 is compositionally equivalent to the polyethyleiminodiacetic acid.XNa (PEIDA) composition of the present invention.

Quamme et al., U.S. Pat. No. 4,558,080; Kelly et al., U.S. Pat. Nos. 4,734,216 and 4,781,839; and Chen et al. in U.S. Pat. No. 5,916,991 teach derivatized tannin containing polymer compositions that are effective coagulants for clarification of wastewater.

The use of cationic polymers and anionic polymers as coprecipitants in removing heavy metals from wastewater is known in the art. For instance, Swanson et al. (U.S. Pat. No. 3,947,354) use a cationic polyelectrolyte and anionic xanthate to precipitate and remove metal ions from wastewater. However, Swanson et al.'s selection of anionic polymers is limited to water soluble polyhydroxyl derivatives, such as starch, cellulose, dextrins, hemicellulose, polyvinyl alcohols and preferably anionic starch xanthate.

A drawback to current technologies for treating CMP wastewater is that the copper is coprecipitated with abrasive solids, thus increasing the amount of copper-containing waste generated. Furthermore, current technologies require utilization, with periodic maintenance, of the ion exchange bed to successfully remove copper to compliance level. Thus, it is an object of the present invention to provide a process for treating CMP wastewater that minimizes the amount of copper-containing waste generated. A further object of the present invention is to provide a novel treatment for CMP wastewater.

SUMMARY OF THE INVENTION

The present invention is directed to the use of a novel combination of a polymeric chelant and coagulant to treat metal containing wastewater. More particularly, the invention is directed at removing copper from CMP wastewater.

DETAILED DESCRIPTION OF THE INVENTION

The polymeric chelants of the present invention are well known to those skilled in the art. For example, see the compositions of Grinstead, U.S. Pat. No. 4,741,831, Carey et al., U.S. Pat. No. 5,594,096, Salmen et al., U.S. Pat. No. 6,258,277, and Smith et al., PCT WO 96/38493. Preferred are polymeric chelants are derived from polyamines including diethylenetriamine (DETA), triethylenetetraamine (TETA), tetraethylenepentaamine (TEPA), poly[vinylamine], and branched or linear poly[ethylenimine] (PEI). Particularly preferred are water-soluble polymers characterized as branched polymers represented by the following formula:

Formula I

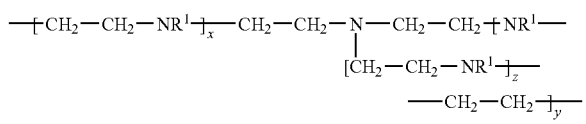

wherein $R^1$ independently is —H, —$CS_2R^2$, —$CH_2CO_2R^2$, —CH2—$PO_3R^2$, or mixtures thereof; $R^2$ each independently represents —H or a cation; and the sum of x, y and z is an integer greater than 15.

Coagulants with utility in treating wastewater are well known to those skilled in the art. Preferred are tannin containing polymers as taught by Quamme et al., U.S. Pat. No. 4,558,080 and Chen et al., U.S. Pat. No. 5,916,991. The coagulant may be described as a water soluble or dispersible copolymer of a tannin and a cationic monomer selected from the group consisting of methyl chloride or dimethyl sulfate quaternary salt of dimethyl aminoethyl acrylate, diethylaminoethyl acrylate, dimethylaminoethyl methacrylate, diethylaminoethyl methacrylate, dimethylaminopropyl methacrylamide, dimethylaminopropyl acrylamide, and diallyl dimethyl ammonium chloride.

Particularly preferred cationic polymers are the tannin adducts as taught by Chen et al. '991. A particularly preferred commercially available cationic tannin available from GE Water and Process Technologies is Klaraid™ PC2705 composed of tannin and 2-acryloxyethyltrimethyl ammonium chloride (AETAC). The structure of unmodified Wattle tannin appears below.

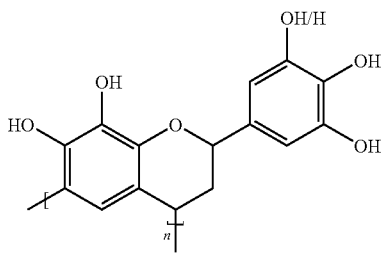

The invention will now be further described with reference to a number of specific examples that are to be regarded solely as illustrative and not restricting the scope of the present invention.

EXAMPLES

Example 1

Preparation of Polyethyleniminodiacetic Acid (PEIDA)

To a reactor equipped with an overhead stirrer, thermocouple, reflux condenser, nitrogen sparge, addition port, heating mantle, and a pH meter was added distilled water (30 g) and monochloroacetic acid (35.2 g, 0.372 moles). The reactor contents were sparged of air with nitrogen, cooled to 0° C., and then aqueous poly[ethylenimine] (50%, 32 g, 0.372 moles, BASF Lupasol P) was added drop wise over a 10 minute period with cooling. Aqueous sodium hydroxide (50%, 29.1 g, 0.372 moles) was then charged over a 20 minute period with cooling, maintaining the batch temperature at 5-10° C. The batch temperature was increased to 90° C. and, after 20 minutes, a second addition of aqueous sodium hydroxide (50%, 29.1 g, 0.372 moles) was conducted over a 2 hour period as required to maintain a pH of 9-11 into the feed, after which the batch was held at 90° C. overnight. The resulting crude product was precipitated in methanol to wash away the sodium chloride byproduct, filtered and dried in vacuo at 40° C. The resultant PEIDA was made down as a 5 wt. % solids solution in DI water for testing.

Example 2

Preparation of Polyethyleniminodiacetic Acid (PEIDA)

To a reactor setup as described in Example 1 was charged DI water (102 g) and sodium chloroacetate (55.39 g, 0.466 moles). The reactor contents were sparged of air with nitrogen, and then poly[ethylenimine] (20.5 g, 0.466 mole, Nippon Shokubai Epomin SP-200) was added over a 6 minute period, during which the batch exothermed to 43° C. Aqueous sodium hydroxide (50%, 37.28 g, 0.466 moles) was then charged for 1 hour, during which the batch temperature was gradually increased to 90° C. The batch was held at 90° C. for 1 hour, then cooled to room temperature, adjusted to 39.6 wt. % solids with DI water, and used without any further purification.

Example 3

Preparation of Polyethyleniminodiacetic Acid (PEIDA)

To a reactor setup as described in Example 1 was charged DI water (120 g) and poly[ethylenimine] (24.1 g, 0.559 mole, Nippon Shokubai Epomin SP-200). The reactor contents were sparged of air with nitrogen, and sodium chloroacetate (66.4 g, 0.559 moles) was added. The batch was then heated to 75° C. and held for 30 minutes. Aqueous sodium hydroxide (50%, 44.7 g, 0.559 moles) was then charged over a 2 hour period, during which the batch temperature was maintained at 75° C. The batch was held at 75° C. for 90 minutes, then cooled to room temperature, adjusted to 38.2 wt. % solids with DI water, and used without any further purification.

Example 4

Evaluation of Polymeric Chelant PEIDA and Coagulant PC 2705 as Separate Treatments in Synthetic CMP Filtrate A 2:1 molar ratio of copper sulfate and trisodium citrate, respectively, and benzotriazole (BZT) were mixed in DI water to yield a 50 ppm copper and 25 ppm BZT CMP synthetic filtrate with a pH of 3.70. To aliquots of this solution mixing at 100 rpm, a polymeric chelant in the absence of a coagulant or a coagulant in the absence of a polymeric chelant was charged then allowed to mix for 15 minutes. Treated aliquots were filtered using a 0.45 micron filter. The isolated filtrate was then analyzed for pH and copper content via ICP, the results of which are summarized in Table 1. Test results demonstrated that non-dithiocarbamate polymeric chelant and coagulant as separate treatments are not as effective in precipitating copper from the test matrix.

TABLE 1

| | Dosage ppm | Filtrate pH | Copper ppm | Removal Efficiency |
|---|---|---|---|---|
| Polymeric Chelant | | | | |
| Ex. 1 | 50 | 3.88 | 48 | 6% |
| Ex. 1 | 100 | 4.29 | 48 | 6% |
| Ex. 1 | 200 | 6.8 | 47 | 8% |
| Ex. 1 | 300 | 9.48 | 50 | 2% |
| Ex. 1 | 400 | 9.27 | 50 | 2% |
| Ex. 1 | 500 | 10.2 | 49 | 4% |
| Ex. 1 | 600 | 9.80 | 49 | 2% |

TABLE 1-continued

| Coagulant | Dosage ppm | Filtrate pH | Copper ppm | Removal Efficiency |
|---|---|---|---|---|
| PC 2705 | 0 | — | 39 | 0 |
| PC 2705 | 100 | — | 24 | 38.4% |
| PC 2705 | 200 | — | 37 | 5.1% |
| PC 2705 | 300 | — | 38 | 2.5% |
| PC 2705 | 400 | — | 37 | 5.1% |
| PC 2705 | 500 | — | 37 | 5.1% |
| PC 2705 | 600 | — | 37 | 5.1% |
| PC 2705 | 700 | — | 37 | 5.1% |
| PC 2705 | 800 | — | 36 | 7.7% |

Example 5

Copper Recovery Studies in Actual CMP Slurry—by Jar Test Method

From an actual slurry provided by a chip manufacturer, aliquots of 200 mls were adjusted to appropriate pH using 1M sulfuric acid. Aliquots were later treated with varying amounts of a 5 weight % solution of PC 2705 coagulant and allowed to mix at 100 rpm for 1 minute, then at 30 rpm for 10 minutes. The resulting flocs from treatment were allowed to settle for 5 minutes. After settling, a portion of supernatant was filtered using a 0.45 micron filter, submitted for ICP copper analysis and turbidity. The best treatment dosage that gave quantitative copper recovery in the permeate was found to be 150 ppm at pH 4 and turbidity 1.33 NTU. The results are summarized in Table 2.

TABLE 2

| PC 2705 | Slurry pH 6.5 | | Slurry pH 4.5 | | Slurry pH 4 | | Slurry pH 3.5 | | Slurry pH 3 | |
|---|---|---|---|---|---|---|---|---|---|---|
| | Cu ppm | Turbidity NTU | Cu ppm | Turbidity NTU | Cu ppm | Turbidity NTU | Cu ppm | Turbidity NTU | Cu ppm | Turbidity NTU |
| 0 | 7 | 252 | 11 | 227 | 12 | 224 | 13 | 225 | 12 | 224 |
| 25 | 5.6 | 225 | 11 | 193 | 12 | 181 | 13 | 187 | 13 | 223 |
| 50 | 5.7 | 92.7 | 11 | 93.9 | 12 | 69.1 | 13 | 75.4 | 12 | 112 |
| 75 | 5.6 | 34.7 | 10 | 34.4 | 13 | 38.7 | 12 | 30.7 | 13 | 58.3 |
| 100 | 5.2 | 14.3 | 11 | 7.55 | 12 | 12.7 | 12 | 12 | 12 | 17.5 |
| 125 | 6.1 | 2.58 | 8.7 | 5.63 | 11 | 5.75 | 13 | 5.79 | 13 | 7.38 |
| 150 | 3.4 | 1.38 | 11 | 1.57 | 12 | 1.33 | 13 | 2.02 | 11 | 4.01 |
| 175 | 4.7 | 11.5 | 10 | 1.16 | 13 | 1.59 | 13 | 1.94 | 13 | 1.97 |
| 200 | 3.4 | 23.3 | 12 | 13.51 | 12 | 17.6 | 13 | 1.2 | 12 | 2.24 |

Example 6

Copper Recovery from CMP Slurry Using Ceramic Membrane

A treatment dose of 150 ppm PC 2705 at pH 4 from Example 5 (Table 2) was used to examine copper retention in the permeate after suspended solids removal using a ceramic membrane. Sixteen gallons of CMP slurry was adjusted to pH 4, treated with 150 ppm PC 2705, and mixed at 500 rpm for 30 seconds, then at 200 rpm for 5 minutes. Upon floc formation, the treated slurry was transferred into a reservoir, and then passed through a ceramic membrane at an initial pressure of 25 PSI. The permeate was collected at 10 minute intervals and then analyzed for copper via ICP. Results summarized on Table 3 demonstrated a quantitative recovery of copper in the permeate.

TABLE 3

| | Cu in CMP slurry | Permeate t = 0 | Permeate t = 10 | Permeate t = 20 | Permeate t = 30 | Permeate t = 40 | Permeate t = 50 | Permeate t = 60 |
|---|---|---|---|---|---|---|---|---|
| PSI | | 25 | 30 | 35 | 37 | 45 | 62 | 85 |
| Cu in filtrate ppm | 11 | 11 | 11 | 12 | 12 | 13 | 12 | 12 |

Example 7

Evaluation of a Polymeric Chelant and a Coagulant in a Synthetic CMP Filtrate Equimolar amounts of copper sulfate and trisodium citrate were mixed in DI water to yield a 50 ppm copper CMP synthetic filtrate with a pH 5.1. A coagulant (Klaraid PC2705) was then charged to aliquots of this solution, and the solution was mixed at 100 rpm for 2 minutes. The polymeric chelant from Example 1 was then charged and the solution mixed for an additional 5 minutes at 100 rpm. The resulting suspension was allowed to settle for 5 minutes before filtering through a 0.45 micron filter. The isolated filtrate was then analyzed for pH and copper content via ICP, the results of which are summarized in Table 4. Results demonstrated that blends of the cationic tannin coagulant Klaraid PC2705 with a polymeric chelant were effective in precipitating copper from the test matrix.

TABLE 4

| PC2705 ppm | Polymeric Chelant | Dosage ppm | Filtrate pH | Copper ppm | Removal Efficiency |
|---|---|---|---|---|---|
| 50 | Ex. 1 | 50 | 5.3 | 31.0 | 38.0% |
| 100 | Ex. 1 | 100 | 5.5 | 23.0 | 54.0% |
| 200 | Ex. 1 | 200 | 6.4 | 21.0 | 58.0% |
| 300 | Ex. 1 | 300 | 6.7 | 0.39 | 99.2% |
| 400 | Ex. 1 | 400 | 7.2 | 0.49 | 99.0% |
| 500 | Ex. 1 | 500 | 8.1 | 0.59 | 98.8% |
| 600 | Ex. 1 | 600 | 8.1 | 0.75 | 98.5% |
| 700 | Ex. 1 | 700 | 8.6 | 0.70 | 98.6% |
| 800 | Ex. 1 | 800 | 8.9 | 0.99 | 98.0% |

Example 8

Evaluation in Actual CMP Filtrate

An actual copper containing CMP filtrate provided by a computer chip manufacturer was analyzed and found to have a pH of 3.31 and contain 19 ppm copper. Aliquots of this permeate were then treated according to the process described in Example 7. The isolated effluent was then analyzed for pH and copper content via ICP, the results of which are summarized in Table 5. Results translated to results in Example 7, which were based on synthetic filtrate.

TABLE 5

| PC2705 ppm | Polymeric Chelant | Dosage ppm | Filtrate pH | Copper ppm | Removal Efficiency |
|---|---|---|---|---|---|
| 50 | Ex. 1 | 50 | 3.56 | 12.0 | 36.8% |
| 100 | Ex. 1 | 100 | 3.60 | 9.1 | 52.1% |
| 200 | Ex. 1 | 200 | 3.97 | 2.9 | 84.7% |
| 300 | Ex. 1 | 300 | 4.56 | 0.72 | 96.2% |
| 400 | Ex. 1 | 400 | 5.25 | 0.55 | 97.1% |
| 500 | Ex. 1 | 500 | 5.83 | 0.39 | 97.9% |
| 600 | Ex. 1 | 600 | 6.22 | 0.29 | 98.5% |
| 700 | Ex. 1 | 700 | 6.55 | 0.27 | 98.6% |
| 800 | Ex. 1 | 800 | 7.00 | 0.22 | 98.8% |

Example 9

Evaluation of Dithiocarbamate Polymeric Chelant with Coagulant in Actual CMP Slurry A CMP waste slurry provided by a computer chip manufacturer, containing 24 ppm of copper was treated with 100 ppm of PC 2705 and allowed to mix for 1 minute at 100 rpm. Resulting flocs were allowed to settle and supernatant was decanted and adjusted to a predetermined pH using 0.1M NaOH. The supernatant aliquots was then treated with the dithiocarbamate polymeric chelant (MR 2405), and the resulting suspension was allowed to settle for 5 minutes, then filtered through a 0.45 micron filter. The isolated filtrate was then analyzed for residual copper content via ICP, the results of which are summarized in Tables 6, 7 and 8 (left column). The process was repeated with co-treatment of the supernatant aliquots with dithiocarbamate and PC 2705 coagulant. The co-treated permeate was then allowed to mix at 100 rpm for 1 minute, then at 30 rpm for 10 minutes and allowed 5 minutes for settling. After settling, a portion of supernatant was filtered using a 0.45 micron filter, and submitted for ICP copper analysis. Results on Tables 6, 7 and 8 (right column) demonstrated that a combination of dithiocarbamate polymeric chelant and coagulant is more effective in removing copper than dithiocarbamate as a single treatment.

TABLE 6

| Test 2: pH = 3.85 without PC2705 | | | Test 2i: pH = 3.85 with PC 2705 | | | |
|---|---|---|---|---|---|---|
| MR2405 ppm ACTIVES | Copper (ppm) | % Cu Removal | MR2405 ppm ACTIVES | PC2705 ppm ACTIVES | Copper (ppm) | % Cu Removal |
| 0 | 24 | 0 | 100 | 400 | 8 | 67 |
| 100 | 5.3 | 78 | 300 | 200 | <0.01 | 99.9 |
| 300 | 0.08 | 99.7 | 300 | 400 | 4.4 | 82 |
| 500 | 4.9 | 80 | 500 | 400 | 0.05 | 99.8 |
| 700 | 6.3 | 74 | 700 | 400 | 0.32 | 98.7 |
| 900 | 6.3 | 74 | 900 | 400 | <0.01 | 99.9 |

TABLE 7

| Test 3: pH = 5 without PC 2705 | | | Test 3i: pH = 5 with PC 2705 | | | |
|---|---|---|---|---|---|---|
| MR2405 ppm ACTIVES | Copper (ppm) | % Cu Removal | MR2405 ppm ACTIVES | PC2705 ppm ACTIVES | Copper (ppm) | % Cu Removal |
| 0 | 23 | 0 | 100 | 400 | 9.7 | 58 |
| 100 | 4.2 | 82 | 300 | 200 | 0.14 | 99.4 |
| 300 | 0.09 | 99.6 | 300 | 400 | 1 | 95.6 |
| 500 | 13 | 43 | 500 | 200 | 1.8 | 92 |

TABLE 7-continued

| Test 3: pH = 5 without PC 2705 | | | Test 3i: pH = 5 with PC 2705 | | | |
|---|---|---|---|---|---|---|
| MR2405 ppm ACTIVES | Copper (ppm) | % Cu Removal | MR2405 ppm ACTIVES | PC2705 ppm ACTIVES | Copper (ppm) | % Cu Removal |
| 700 | 11 | 52 | 500 | 400 | 0.02 | 99.9 |
| 900 | 14 | 39 | 700 | 400 | <0.01 | 99.9 |
| | | | 900 | 400 | 1.1 | 95 |

TABLE 8

| Test 4: pH = 7 without PC 2705 | | | Test 4i: pH = 7 with PC 2705 | | | |
|---|---|---|---|---|---|---|
| MR2405 ppm ACTIVES | Copper (ppm) | % Cu Removal | MR2405 ppm ACTIVES | PC2705 ppm ACTIVES | Copper (ppm) | % Cu Removal |
| 0 | 23 | 0 | 100 | 400 | 18 | 22 |
| 100 | 4.4 | 81 | 300 | 200 | 0.08 | 99.6 |
| 300 | 0.41 | 98.2 | 300 | 400 | 0.06 | 99.7 |
| 500 | 20 | 13 | 500 | 400 | 0.02 | 99.9 |
| 700 | 21 | 9 | 700 | 400 | 0.61 | 97 |
| 900 | 23 | 0 | 900 | 400 | 1.1 | 95 |

Example 10

Evaluation in Actual CMP Slurry

To an actual CMP slurry wastewater provided by a computer chip manufacturer, containing 13 ppm copper at pH 6, was charged a coagulant Klaraid PC2705, and the solution was mixed at 100 rpm for 1 minute. The polymeric chelant was then charged and the solution was mixed for 1 minute at 100 rpm, and then 10 minutes at 40 rpm. The resulting suspension was then filtered through a 0.45 micron filter. The isolated permeate was analyzed for copper content via ICP, the results of which are summarized in Table 9. This test demonstrated that results observed in the synthetic CMP filtrate in Example 7 (Table 4) translated to results of the present example. The presence of suspended solids in the slurry did not significantly diminish the copper removal efficiency of the present invention.

TABLE 9

| PC2705 ppm | Polymeric Chelant | Dosage ppm | Slurry Cu ppm | Permeate Cu ppm | Removal Efficiency |
|---|---|---|---|---|---|
| 100 | Ex. 3 | 100 | 13 | 0.96 | 92.6% |
| 200 | Ex. 3 | 200 | 13 | 0.91 | 93.0% |
| 300 | Ex. 3 | 350 | 13 | 0.64 | 95.1% |

Example 11

Copper Removal from Permeate by Membrane Separation

Two gallons of permeate containing 11 parts copper were collected after passing 20 gallons of actual CMP slurry (each treated with 150 ppm PC 2705) through a ceramic membrane, as described in Example 6. The permeate was treated with 300 ppm of PC 2705 and mixed at 500 rpm. After 30 seconds, 300 ppm of a polymeric chelant from Example 3 was added, and the mixing speed was slowed to 200 rpm and allowed to mix for 5 minutes. The resulting precipitate was isolated using the same membrane. The permeate was analyzed for residual copper via ICP. Copper removal results and basic engineering parameters are provided in Table 10. Results demonstrated that the application of the membrane separation technique in conjunction with the materials of the present invention in treating copper CMP wastewater was successful. Copper was removed to sub-ppm level without the use of ion-exchange.

TABLE 10

| Time minute | Pressure PSI | Residual Cu ppm | Copper Removal Efficiency |
|---|---|---|---|
| 0 | 30 | 11 | 0% |
| 1 | 30 | 0.39 | 96.45 |
| 4 | 40 | 0.42 | 96.18% |
| 5 | 40 | 0.44 | 96.0% |

While the present invention has been described with respect to particular embodiments thereof, it is apparent that numerous other forms and modifications of the invention will be obvious to those skilled in the art. The appended claims and the present invention generally should be construed to cover all such obvious forms and modifications which are within the true spirit and scope of the present invention.

What is claimed is:

1. A method for treating CMP waste which comprises treating the waste with a coagulant to separate solids from metals, and without ion exchange removing the chelated metals from filtrate by co-precipitation with a combination of about 300-800 ppm of the coagulant and about 300-800 ppm of a polymeric chelant, wherein (a) the polymeric chelant has the formula:

Formula I

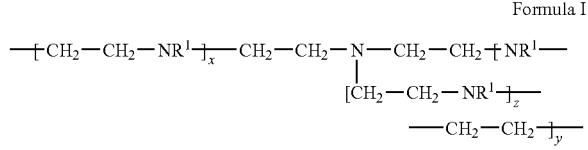

wherein $R^1$ independently is $-CH_2CO_2R^2$, $-CH_2-PO_3R^2$, or mixtures thereof; $R^2$ each independently represents $-H$ or a cation; and the sum of x, y and z is an integer greater than 15; and (b) the coagulant is composed of a water soluble or dispersible copolymer of a tannin and 2-acryloxyethyltrimethyl ammonium chloride (AETAC).

2. The method of claim 1, wherein the said metals are alkaline earth metals, transition metals, post-transition metals, lanthanides, actinides, arsenic or tellurium.

3. The method of claim 1, wherein said combination is effective for precipitating alkaline earth metals, transition metals, post transition metals, lanthanides and actinides.

4. The method of claim 1, wherein said combination is effective for precipitating arsenic, selenium and tellurium.

5. The method of claim 1, wherein said combination is effective for precipitating chelated copper.

6. A method for removing contaminants from an aqueous solution which comprises adding to said solution a composition comprising a combination of (a) about 300-800 ppm of a polymeric chelant having the formula:

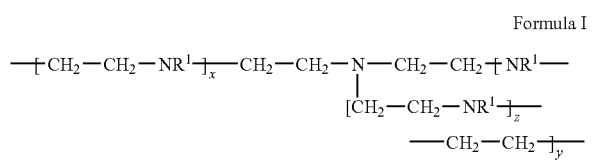

Formula I wherein $R^1$ independently is $-CH_2CO_2R^2$, $-CH_2-PO_3R^2$, or mixtures thereof; $R^2$ each independently represents $-H$ or a cation; and the sum of x, y and z is an integer greater than 15; and (b) about 300-800 ppm of a coagulant composed of a water soluble or dispersible copolymer of a tannin and 2-acryloxyethyltrimethyl ammonium chloride (AETAC), methacrylate, diethylaminoethy methacrylate, dimethylaminopropyl methacylaminde, wherein said contaminants are removed without ion exchange.

7. The method of claim 6, wherein said composition is effective for precipitating alkaline earth metals, transition metals, post transition metals, lanthanides, and actinides from said aqueous solution.

8. The method of claim 6, wherein said composition is effective for precipitating arsenic, selenium and tellurium from said aqueous solution.

9. The method of claim 6, wherein said aqueous solution is cooling tower blowdown or municipal wastewater.

10. The method of claim 6, wherein the said contaminants are alkaline earth metals, transition metals, post-transition metals, lanthanides, actinides, selenium, arsenic or tellurium.

11. The method of claim 6, wherein a filtering device is used for flocs removal after precipitation with the composition.

12. The method of claim 11, wherein the filtering device is a membrane or filter.

13. The method of claim 1, wherein a filtering device is used for flocs removal after precipitation with the combination.

14. The method of claim 13, wherein the filtering device is a membrane or filter.

* * * * *